(12) United States Patent
Sato et al.

(10) Patent No.: US 6,338,009 B1
(45) Date of Patent: Jan. 8, 2002

(54) METHOD AND APPARATUS FOR ESTIMATING FREQUENCY CHARACTERISTICS OF POWER SYSTEM, AND APPLICATION THEREOF

(75) Inventors: Yasuo Sato, Hitachi; Chihiro Fukui, Hitachinaka; Tomoharu Nakamura, Hitachiota, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/175,460

(22) Filed: Oct. 20, 1998

(30) Foreign Application Priority Data

Oct. 22, 1997 (JP) .............................................. 9-289371

(51) Int. Cl.[7] ................................................. H02J 3/00
(52) U.S. Cl. ......................... 700/286; 700/287; 700/295
(58) Field of Search ................................ 700/286, 287, 700/291, 295, 297; 703/18; 322/21, 58, 32; 307/102; 290/40 B; 702/60, 75

(56) References Cited

U.S. PATENT DOCUMENTS 4,785,405 A * 11/1988 Hasegawa et al. .......... 700/297
6,118,187 A * 9/2000 Hepner et al. ............ 290/40 B

FOREIGN PATENT DOCUMENTS

| JP | 4-140022 | 5/1992 |
| JP | 7-108063 | 11/1995 |

* cited by examiner

Primary Examiner—William Grant
Assistant Examiner—Steven R. Garland
(74) Attorney, Agent, or Firm—Mattingly, Stanger & Malur, P.C.

(57) ABSTRACT

A method of, and an apparatus for, estimating frequency characteristics of a power system in accordance with the operation conditions of the power system. In the estimation of frequency characteristics, a sensitivity coefficient of power control of each generator with respect to a frequency deviation is defined as a frequency characteristic coefficient of the generator and this frequency characteristic coefficient of the generator is weighted in accordance with its rated output so as to determine a frequency characteristic coefficient of a generator group comprising a plurality of generators belonging to the power system. A frequency characteristic coefficient of a load determined separately is added to the frequency characteristic coefficient of the generator group, and estimated frequency characteristics for the supply-and-demand imbalance quantity of the power system are provided.

19 Claims, 6 Drawing Sheets

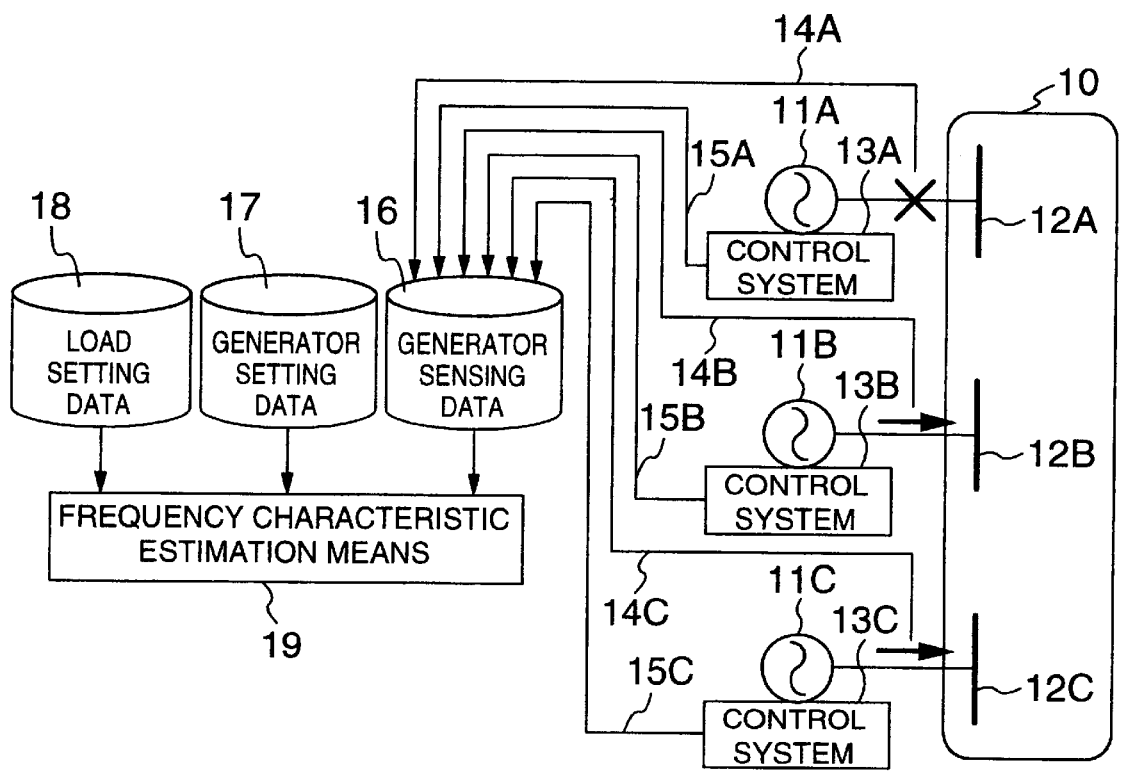
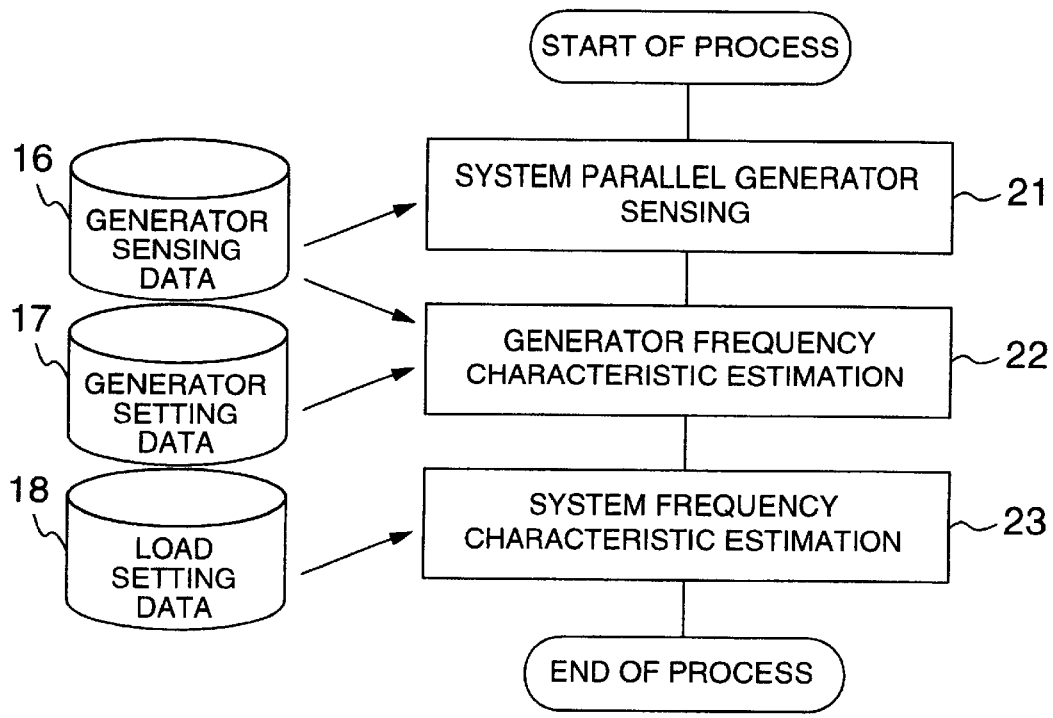

| STATE | RANGE OF RATED OUTPUT | | RESERVE POWER |
|---|---|---|---|
| A | ALL GENERATORS HAVE MARGIN OF POWER CONTROL | | |
| B | POWER CONTROL OF PART OF GENERATORS IS LIMITED | REMAINING OF GENERATORS REACHES POWER LIMIT BUT HAS MARGIN OF RESERVE POWER | |
| C | PART OF GENERATORS REACHES POWER LIMIT BUT HAS MARGIN OF RESERVE POWER | | |
| D | ALL GENERATORS REACH POWER LIMIT INCLUSIVE OF RESERVE POWER | | |

METHOD AND APPARATUS FOR ESTIMATING FREQUENCY CHARACTERISTICS OF POWER SYSTEM, AND APPLICATION THEREOF

BACKGROUND OF THE INVENTION

This invention relates to a method of, and apparatus for, estimating frequency characteristics of a power system. More particularly, the present invention relates to a technology, and its application, of receiving on-line information of generators and governors and appropriately estimating frequency characteristics of a power system on the basis of the on-line information.

A supply-and-demand imbalance and a frequency deviation have a close relationship in the operation of a power system. This relationship of the frequency deviation with the supply-and-demand imbalance is generally referred to as "frequency characteristics of a system". The frequency characteristics must be grasped for planning and operating a power system.

For example, the frequency characteristics are utilized in frequency stabilization apparatuses. To correct the frequency to an appropriate range to cope with an abrupt change of the frequency for some reason, the supply-and-demand imbalance must be solved by quick generator shedding and load shedding to suitable levels. To calculate a supply-and-demand imbalance resolution quantity necessary for absorbing the frequency fluctuation at this time, it is essential to grasp the frequency characteristics of the power system. Therefore, an estimated value of the frequency characteristics calculated empirically is set to the power system as a control object in the conventional frequency stabilization apparatuses.

The frequency characteristics of the power system must be grasped not only for the frequency stabilization apparatus but also for monitoring the frequency in the restoring operation of the accident of the power system, for example. In this case, too, the conventional apparatus makes use of the set value determined empirically.

JP-B-7-108063, for example, discloses an example of the frequency stabilization apparatus of a separation system. The prior art reference simulates an assumed separation system to a one generator-to-one load model and sets empirical frequency characteristic coefficients to the generators and the loads, respectively.

SUMMARY OF THE INVENTION

However, the prior art technology has the limits in improving control accuracy because it does not take into consideration the change of the frequency characteristic coefficient with the change of the conditions of the generators and the loads resulting from the change of the operation condition.

Particularly because the frequency characteristics of the generators are the main factor of the frequency characteristics of the overall system, it has been desired to dynamically estimate the frequency characteristics of the power system in match with the generator-group configuration in the case of the system separation operation that assumes great changes in the generator-group configuration and in the operation condition.

The frequency stabilization apparatus described in JP-A-4-140022 enables the frequency characteristics of the power system to be adapted to the supply-and-demand imbalance. However, because this prior art does not take the change of the operation condition of each generator as the main factor of the frequency characteristics into consideration on one hand and because it depends on the actual measurement of the frequency itself of the power system, on the other hand, this frequency stabilization apparatus involves the problem that it cannot easily adapt itself to any abrupt change of the supply-and-demand condition of the generators, such as generator shedding.

It is an object of the present invention to provide a method of, and an apparatus for, estimating frequency characteristics of a power system in accordance with the operation condition of the power system.

The frequency characteristics of the power system depend on the frequency characteristics of the generators and on the frequency characteristics of the loads, but the frequency characteristics of the generators are predominant because drooping control is applied to the generators. Incidentally, it is practically difficult to estimate the frequency characteristics of the overall load in match with the supply-and-demand condition because the frequency characteristics of the individual loads must be estimated by measuring the operation conditions of all the loads. Therefore, it has been inevitable in the past to conduct the estimation on the basis of a statistical processing. Nonetheless, the information necessary for estimating the frequency characteristics of the generators such as the information about the generators connected in parallel in the system, the information about the construction of the governor provided to each generator and the information on the operation condition, for example, can be easily measured on an on-line basis.

According to one aspect of the present invention, a method of estimating frequency characteristics of a power system for accomplishing the object described above comprises the steps of defining a sensitivity coefficient of power control of generators with respect to a frequency deviation, such as a proportional constant (1/delta), as the frequency characteristics of the generators; grouping power controllable generators of the power system into a generator group and determining the frequency characteristics of the generator group; multiplying the frequency characteristic coefficient of the individual generator by the proportion of its rated output to the rated outputs of all the generators, adding the products so obtained for all the generators and determining the sum obtained thereby as the overall frequency characteristic coefficient; and performing the above-defined operations for power controllable generator groups gathered in accordance with different supply-and-demand conditions and providing estimated frequency characteristics of the power system with respect to the overall supply-and-demand condition of the generator group, that is, the supply-and-demand imbalance quantity.

In other words, because the sensitivity characteristics of power control of the generators with respect to the frequency deviation correspond basically to the frequency characteristics of the generators, the sensitivity coefficient of power control of each generator is defined as the frequency characteristic coefficient of the generator. Simply speaking, the frequency characteristic coefficient of a generator group comprising a plurality of generators can be determined by adding the frequency characteristic coefficients of a plurality of generators belonging to the power system. However, the power control quantity becomes different if the generators have any difference in their rated outputs and in such a case, their contribution ratio to the frequency characteristics becomes different, too. Therefore, weighting is applied to the frequency characteristic coefficient of the individual generator in accordance with its rated output and the frequency characteristic coefficient of the generator group comprising a plurality of generators is then determined. In this way, the frequency characteristic coefficient of the generator group can be determined appropriately.

In this case, the frequency characteristic coefficient of the generator group can be determined by, for example, multiplying the frequency characteristic coefficient of the individual generator by its rated output, summing the product so obtained for all the power-controllable generators and dividing the sum by the total output quantity of the generator group.

The frequency characteristic coefficient of the overall power system is then determined by adding the frequency characteristic coefficient of the overall load to the frequency characteristic coefficient of the generator group estimated in the manner described above. This frequency characteristic coefficient of the overall power system is a coefficient that associates the supply-and-demand imbalance with the frequency deviation and can be expressed by a segmented function.

In the description given above, the frequency characteristic coefficient of the generator can be determined on the basis of the droop ($\delta$) of the governor so provided as to correspond to each generator. The frequency characteristic coefficient is preferably determined for those generators which have a margin of output control inclusive of reserve power. Preferably, further, the operation conditions of the generators are divided into (a) the first state where all the generators have the margin of output control; (b) the second state where a part of the generators is limited in power control; (c) the third state where a part of the generators reaches the limit of power control while the remaining generators still have the margin of power control; and (d) the fourth state where all the generators reach the limit of power control inclusive of reserve power, the supply-and-demand imbalance is so divided into four regions as to correspond to these four states, respectively, and the frequency characteristic coefficient of the generator group is determined for each of these regions. According to this method, the frequency characteristics of the power system can be estimated appropriately in accordance with the practical operation condition by taking the load limit of the generators into consideration.

More specifically, data as to paralleled generators or separated generators and the data on the operation condition are collected on the basis of the generator outputs as the on-line observation values, and the operation method of each generator is grasped. Here, the term "operation method" represents a load reference value corresponding to the generation output required by a control station that monitors the supply-and-demand condition of the overall system, the load limit value of the generators, and so forth. The term "load limit value" of the generator represents the range of the limiter of the governor grasped from the data base of the rated generator setting data in which the governor can control or the range in which its operation is limited. The range in which power control of each generator can be made is grasped from these generator output and operation method, and the supply-and-demand imbalance region is divided by gathering such ranges into the zones in which the power controllable generators belong to the same group. The frequency characteristics of each generator group are estimated by taking the power controllable generators into specific account for each of the divided supply-and-demand imbalance regions and furthermore, the frequency characteristics of the loads estimated by known separate means are added to obtain the frequency characteristics of the overall system, and the frequency characteristics of the power system inside a specific supply-and-demand imbalance region are estimated.

Incidentally, it is known that the load reference values of the generators and the load limit values change depending on the season and on the time of each day, and the load reference value and the load limit value are assumed for each season and for each time on the basis of the known data and are stored in memory means. The frequency characteristics of the power system can be determined by adding the season and the time as the specific factors.

As the frequency characteristics of all the generators, that is, the frequency characteristics on the supply side, are estimated by the calculation which is suitable for the construction of the generators connected to the system and their operation condition which is made in time as described above, the frequency characteristics of the system can be grasped more accurately. Because the present invention can immediately cope with the change of the generator configuration without waiting for the measurement of the frequency, the present invention can improve accuracy of control in the frequency stabilization apparatus and in various other operations, and can execute planning or a restoring operation with high reliability when applied to planning of the power system and simulation of its restoring operation.

These and other objects, features and advantages of the present invention will become more apparent from the following detailed description of the preferred embodiments taken in conjunction with the accompanying drawings.

BRIEF DESCRIPTION OF THE DRAWINGS

FIG. 1 is a schematic view showing the construction of a frequency characteristic estimation apparatus according to one embodiment of the present invention.

FIG. 2 is a schematic flowchart showing a process procedure of the frequency characteristic estimation apparatus according to one embodiment of the present invention;

DESCRIPTION OF THE PREFERRED EMBODIMENTS

Figures 3, 4:
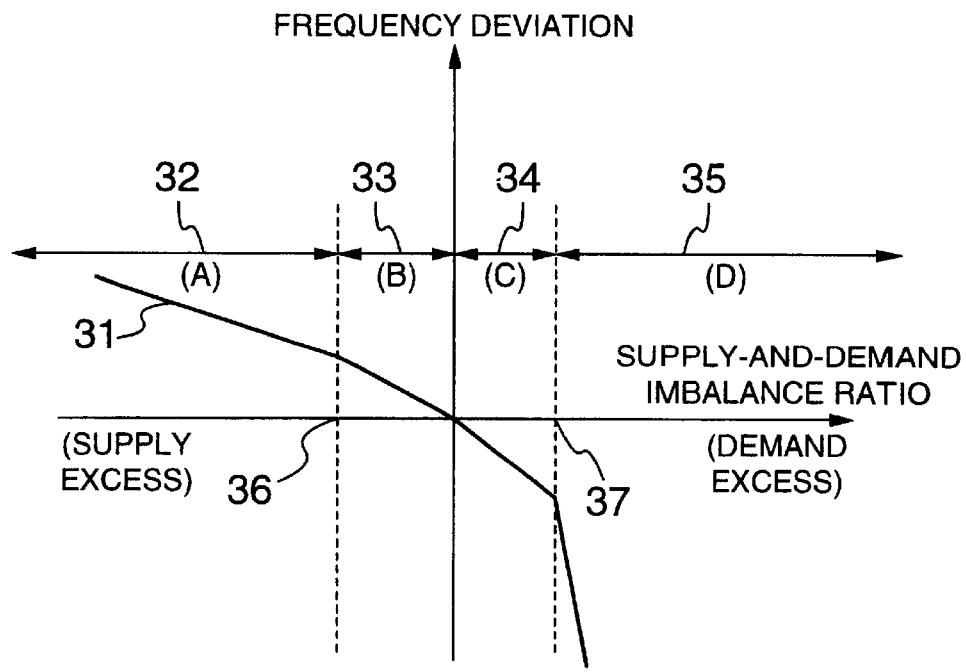
FIG. 3 is a diagram useful for explaining frequency characteristics of a power system.
FIG. 4 is an explanatory view useful for explaining an operation condition of generators corresponding to divided regions of a supply-and-demand imbalance region.

Hereinafter, preferred embodiments of the present invention will be explained in detail with reference to the accompanying drawings.

(First Embodiment)

FIG. 1 shows the overall construction of the embodiment of the present invention when applied to an apparatus for estimating frequency characteristics for the supply-and-demand balance of a power system. In the drawing, a power system 10 includes buses 12A, 12B and 12C connected to the output terminals of generators 11A, 11B and 11C, respectively. Each of the generators 11A to 11C includes a control system 13A to 13C for controlling autonomously the generator output in accordance with an instruction given thereto. Each control system 13A to 13C autonomously adjusts the speed by a governor (not shown in the drawing) provided to each generator 11A to 11C in order to reduce the difference between a rated frequency of the power system 10 and an actual frequency, for example. A computer, not shown, periodically senses on the on-line basis the output power 14A to 14C of each generator 11A to 11C and the condition quantity of each control system 13A to 13C and builds up these data in a generator sensing data base 16. The condition quantity 15A to 15C of each control system in this embodiment represents a load reference value and a load shedding value in the generator governor, that is, the output reference value and the output shedding value of the generator.

Those reference values among the condition quantities of a plurality of generators 11A to 11C and a plurality of control systems 13A to 13C which do not vary with the operation of the system are stored in advance in a generator setting data base 17. In this embodiment, the data base 17 stores the kind of the governor and governor drooping for each generator. As to the load, on the other hand, the frequency characteristics of the load prepared by conventional statistical means, etc, are stored in a load setting data base 18.

The system frequency characteristic estimation means 19 that constitutes one of the features of the present invention comprises a computer, accepts the necessary data from the generator sensing data base 16, the generator setting data base 17 and the load setting data base 18, and executes the estimation of the frequency characteristics of the overall power system in accordance with the following procedure. First, the system frequency characteristic estimation means 19 estimates the frequency characteristics of the generator as the main factor that governs the frequency characteristics of the power system, from the generator sensing data base 16 and the generator setting data base 17. Next, the system frequency characteristic estimation means 19 estimates the frequency characteristics of the overall power system from the frequency characteristics of the generators so estimated and from the frequency characteristics of the loads stored in the load setting data base 18.

FIG. 2 shows the process procedure in the system frequency characteristic estimation means 19, and the estimation procedure of the frequency characteristics will be explained in detail with reference to this flowchart. First, the term "frequency characteristics of the power system" means the frequency characteristics for the supply-and-demand imbalance, and basically represents the proportional relationship between the supply-and-demand imbalance ΔP and a frequency deviation Δf, as expressed by the following equation (1). The estimation of the frequency characteristics corresponds substantially to the estimation of a proportional coefficient $k_S$ (hereinafter called the "frequency characteristic coefficient") of the equation (1). This frequency characteristic coefficient $k_S$ can be regarded as the synthesis result of the frequency characteristic coefficient $k_G$ depending on the generator and the frequency characteristic coefficient $k_L$ depending on the load as expressed by the following equation (2).

$$\Delta P = k_S \cdot \Delta f \quad (1)$$

$$k_S = k_G + k_L \quad (2)$$

The system frequency characteristic estimation means 19 separately estimates and calculates these $k_G$ and $k_L$. First, a system parallel generator sensing process 21 accepts the output of each generator from the generator sensing data base 16 and identifies whether each generator is paralleled or separated, on the basis of the output of each generator. In other words, the generators keeping the effective generator output are judged as being paralleled with the system and those not having the effective output are judged as separated from the system. Next, in conjunction with a plurality of generators which are judged as being paralleled with the system, a generator frequency characteristic estimation process 22 estimates and calculates the frequency characteristic coefficient $k_G$ of the generator group comprising these plurality of generators thus paralleled on the basis of the effective outputs of the generators and on the basis of the setting data stored in the generator setting data base 17. A system frequency characteristic estimation process 23 then adds the frequency characteristic coefficient $k_L$ of the load stored in the load setting data base 18 to the frequency characteristics coefficient $k_G$ of the generator group, corrects the frequency characteristic coefficient $k_G$ and determines the estimation value of the frequency characteristic coefficient $k_S$ of the overall system.

The operation content of the generator frequency characteristic estimation process 22 as the feature of the present invention will be hereby explained in further detail. Generally, the frequency characteristics of the power system substantially have the relationship represented by segmented lines 31 shown in FIG. 3 with the supply-and-demand imbalance. In other words, when the supply exceeds the demand, that is, when the generator output is excessive, the frequency rises. When the demand exceeds the supply, that is, when the generator output is insufficient, on the contrary, the frequency drops as represented by the segmented function.

Generally, the frequency characteristics of the power system greatly depend on the operation conditions of the generators, vary as represented by the segmented lines 31 in FIG. 3 and can be divided into several regions (four regions in the example shown in FIG. 3) in such a manner as to correspond to the supply-and-demand imbalance. In other words, the power control capability of each generator N (N=1, 2, ... N) basically has its limit at the rated output $P_{ON}$. Therefore, the power control capability depends how much margin the actual output $P_{GN}$ has with respect to the rated output $P_{ON}$. However, some generators of the generator group constituting the system are generators under load limit control and others are generators under governor control and consequently, the operation cannot be carried out by simply setting the limit at the rated output $P_{ON}$. For this reason, the frequency characteristics of the overall system exhibit the characteristics of the segmented lines 31 that divides the supply-and-demand imbalance regions shown in FIG. 3.

Power control of the output $P_G$ of the generator is basically done by proportional control to the frequency deviation Δf, and under the state where the power control by the governor is effective, the output $P_{GN}$ of the generator N can be substantially expressed by the following equation (3). In other words, if any supply-and-demand imbalance develops while the generators N are operated at the outputs corresponding to the load reference values LD [percent unit: p.u.], power control is done so as to absorb the frequency deviation resulting from this imbalance. The power control quantity can be acquired by multiplying the frequency deviation $\Delta f$ by a sensitivity coefficient $k_{GN}$ of the frequency control. Since the load reference value LD and the frequency deviation $\Delta f$ are generally expressed in terms of the percent unit [p.u.], the products obtained by multiplying them by the rated output $P_{ON}$, respectively, are believed to correspond to the actual output $P_{GN}$ of the generators N as expressed by the following equation (3).

$$P_{GN} \approx P_{ON}(LD_N - k_G N \cdot \Delta f) \qquad (3)$$

Next, after the power control by the governor is grasped as the equation (3), the operation condition of the generator for each supply-and-demand imbalance region will be explained. The operation conditions of the generator group corresponding to the supply-and-demand imbalance region 32, 33, 34 and 35 are set to the states A, B, C and D, respectively, as shown in FIG. 4. The supply-and-demand imbalance region 32 represents the state where the output of the generator group exceeds the demand, and this state is called the operation condition "A". In other words, all the generators are operated below their rated outputs, the power control has still the margin and the output can be freely regulated (power can be restricted) in accordance with the equation (3) under this state.

The supply-and-demand imbalance region 33 represents the state where the output of the generator group exceeds the demand but a part of the generators is under the state where the power control is limited and consequently, the power control is not substantially made. This state is called the operation condition "B". For example, some of the generators are set to the load limit operation for limiting the power control depending on the degree of the frequency change and in this case, the power control does not operate unless the frequency change exceeds a predetermined insensitive zone having a predetermined level. However, the rest of the generators have the margin for the power control on the basis of the equation (3).

The supply-and-demand imbalance region 34 represents the state where the demand is excessive, the output of the generator group is insufficient and a part of the generators reaches the limit of the power control at the rated output standard while reserve power of a part of the generators under governor control is used so as to keep the frequency. This state is called the operation condition "C". For example, the generators under governor control are operative in such a manner as to increase the generator output beyond the required output designated by the load reference value $LD_N$ and to keep the frequency. However, those generators which operate without reserve power for the generator output, such as load limit operation type generators or a large number of gas turbine generators and combined cycle generators, etc, do not provide the output beyond the set value.

The supply-and-demand imbalance region 35 represents the state where all the generators reach the output limit by using up their reserve power, too, and this state is called the operation condition "D". In this case, the retention operation of the frequency by the generators does not exist any more and the frequency changes solely depending on the frequency characteristics of the load.

The supply-and-demand imbalance condition as the boundary of each condition A to D will be hereby examined. The boundary 36 between the state A of the supply-and-demand imbalance region 32 and the state B of the supply-and-demand imbalance region 33 is determined depending on the operation conditions of the generators having the insensitive zone to the frequency change such as the load limit operation. The supply-and-demand imbalance quantity as this boundary will be called the boundary "A/B". The boundary C between the state B of the supply-and-demand imbalance region 33 and the state C of the supply-and-demand imbalance region 34 corresponds to the supply-and-demand balance point, and the frequency deviation at this time is zero. Further, the boundary 37 between the state C as the supply-and-demand imbalance region 34 and the state D of the supply-and-demand imbalance region 35 is determined depending on the operation condition of the generators operating with reserve power such as the generators under governor control, and the supply-and-demand imbalance quantity as this boundary is called the boundary "C/D".

Figure 5:
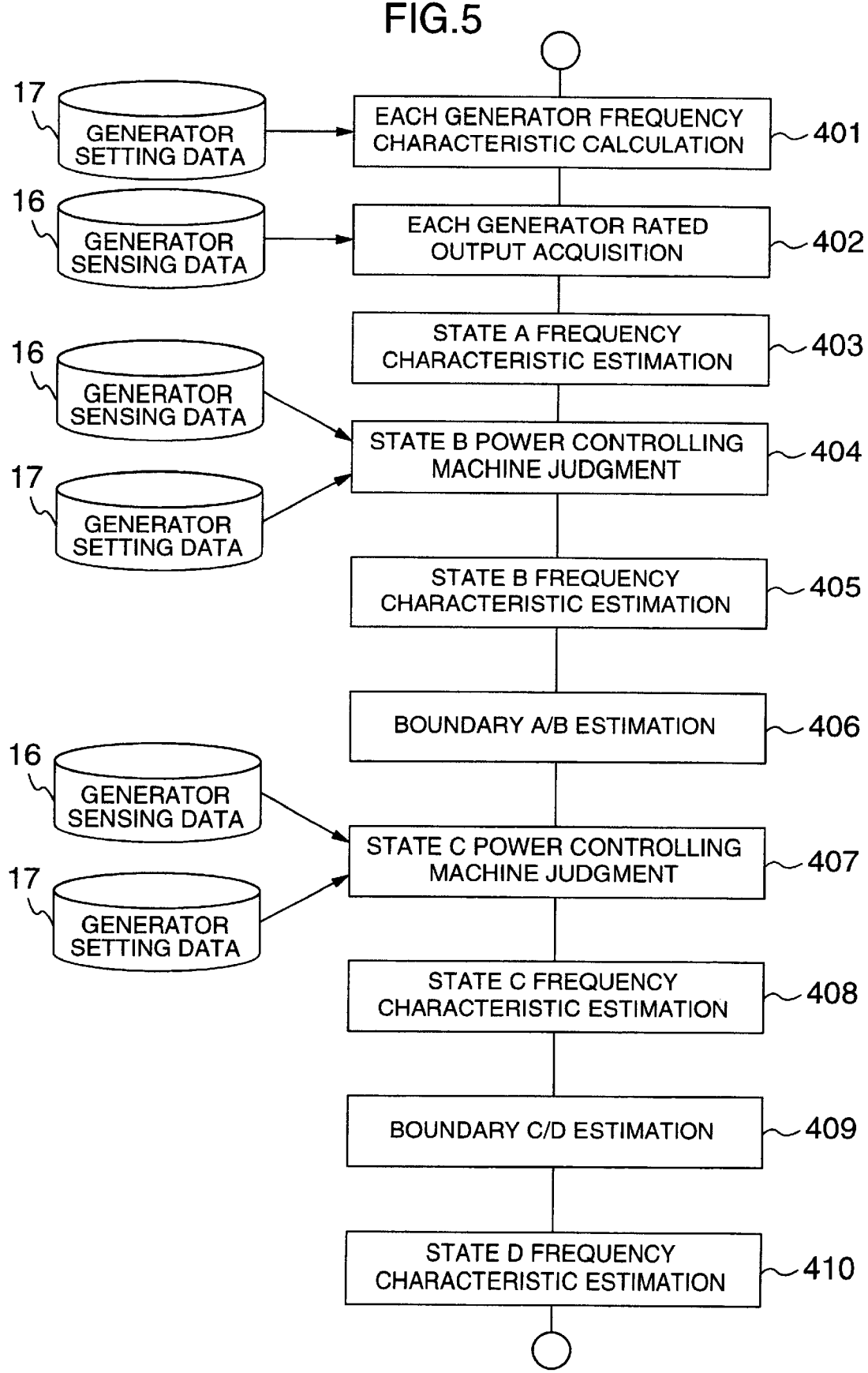
FIG. 5 is a flowchart showing a process procedure of a generator frequency characteristic estimation apparatus.

Now, the generator frequency characteristic estimation means 22 dividedly estimates the frequency characteristics of the generator group as a whole under each supply-and-demand imbalance state as well as the boundaries of these supply-and-demand imbalance states in such a manner as to correspond to these four supply-and-demand imbalance states. FIG. 5 shows the detailed process procedure of the generator frequency characteristic estimation means 22 and the explanation will be given with reference to FIG. 5.

First, each generator frequency characteristic calculation process 401 calculates the frequency characteristics of each generator by assuming the state A where power control can be freely performed. The power control capability of the generator N with respect to the frequency change, that is, the frequency characteristic coefficient $k_{GN}$, is estimated from the conversion of the drooping ratio $\delta_N$ as the control sensitivity of the governor of the generator N. For example, when the drooping ratio $\delta_N$ is given as the sensitivity between the generator percent speed (% speed) [p.u.] and the power control amount in terms of the percentage display to the rated output $P_{ON}$ as the design values, the drooping ratio $\delta_N$ is converted to $k_{GN}$ [p.u./Hz] in accordance with the following equation (4). Incidentally, $f_O$ in the equation (4) represents the rated frequency. It is assumed hereby that the drooping ratio $\delta_N$ is the design value that does not change with the operation and is stored in advance in the generator setting data base 17.

$$k_{GN} = 100/(f_O \cdot \delta_N) \qquad (4)$$

Next, the estimation process of the frequency characteristics of the generator group, that is, the frequency characteristics under the state A, is executed on the basis of the frequency characteristic coefficient $k_{GN}$ of the individual generators N calculated by each generator frequency characteristic calculation process 401. It should be hereby noted that the frequency regulation capability of each generator N to the overall system is not the frequency characteristic coefficient $k_{GN}$ as the power control capability to the individual rated output value $P_{ON}$ but must be evaluated by the power control capability to the generation output of the overall system. Therefore, a process for converting the frequency characteristic coefficient $k_{GN}$ of each generator by the rated output value $P_{ON}$ is executed at each generator rated output acquisition process 402. The rated output value $P_{ON}$ of each generator is acquired from the generator setting data base 17.

A state A frequency characteristic estimation process 403 synthesizes the frequency characteristics of the generator group on the basis of the results of each generator frequency characteristic calculation process 401 and each generator rated output acquisition process 402 in accordance with the following equation (5).

$$K_G = \frac{\sum\limits_{N} P_{ON} \cdot K_{GN}}{\sum\limits_{N} P_{GN}} \quad (5)$$

In other words, the frequency characteristic coefficient $k_{GN}$ is converted to the MW (Mega Watt) base by the rated output value $P_{ON}$ and is summed for the generator group N=1 to N as expressed by the equation (5), and the frequency characteristic coefficient $k_G$ of the generator group is determined by dividing the sum by the total of the actual output values $P_{GN}$ of the generators, that is, by calculating the proportion to the system capacity. The value $K_GA$ is the value obtained by synthesizing the frequency characteristics under the state where the power control is done for all the generators, and expresses the sensitivity characteristics representing the frequency characteristics of the generator group under the supply-and-demand imbalance state of the state A in the supply-and-imbalance region 32 in FIG. 3. Hereinafter, the frequency characteristic coefficient of the generator group under the state A will be expressed as $k_GA$, and the generator group under the state A. as $S_A$, so that $k_GA$ is calculated in accordance with the following equation (6). Incidentally, the generator group $S_A$ corresponds to all the groups of the generators operated in parallel.

$$K_GA = \frac{\sum\limits_{N}^{S_A} P_{ON} \cdot K_{GN}}{\sum\limits_{N}^{S_A} P_{GN}} \quad (6)$$

Next, the process for the supply-and-demand imbalance state of the state B is executed by a state B power controlling machine judgement process 404, a state B frequency characteristic estimation process 405 and a boundary A/B estimation process 406. Firs,t the state B power controlling machine judgement process 404 judges the generator or generators for which the power control is carried out under the state B. To achieve this object, the load reference value $LD_N$ sensed on the on-line basis and the load shedding value are inputted from the generator sensing data base 16, and the existence/absence of the limit operation and the operation shedding ratio are acquired. Here, the term "limit operation" means the operation mode in which a predetermined level of the insensitive zone is set in the power control for the frequency change, such as the load limit operation of the governor. The operation shedding ratio is the limit width of the insensitive zone and the operation shedding ratio of the generator N is hereby expressed by $P_{LMN}$. The unit of this ratio is assumed to be a p.u. value to its own rated output $P_{ON}$. The generators not having the load limit operation or not having the insensitive zone of the power control are handled as the generators having the operation limit ratio of $P_{LMN}=0$. The group of the generators exclusive of the limit operation type generators are set as the generator group $S_B$ as the group of the generators for which the power control is executed under the state B from the judgement result for the limit operation of each generator in the state B power controlling machine judgement process 404 on the basis of the group of all the generators.

The state B frequency characteristic estimation process 405 determines the frequency characteristic coefficient k B by the generator group $S_B$ acquired by the state B power controlling machine judgement process 404 in accordance with the following equation (7). The $k_GB$ value calculated in this way is the sensitivity coefficient that expresses the frequency characteristics of the generator group under the supply-and-demand imbalance state of the state B of the supply-and-demand imbalance region 33 shown in FIG. 3.

$$K_GB = \frac{\sum\limits_{N}^{S_B} P_{ON} \cdot K_{GN}}{\sum\limits_{N}^{S_A} P_{GN}} \quad (7)$$

Next, the boundary A/B estimation process 406 determines the supply-and-demand imbalance quantity P corresponding to the boundary A/B in accordance with the following equation (8).

$$P_{LM} = \frac{\sum P_{ON} \cdot P_{LMN}}{\sum P_{GN}} \quad (8)$$

What is meant by this equation (8) is that because the operation shedding ratio $P_{LMN}$ of each generator N is the ratio to its own rated output, the power shedding ratio is converted to the MW base so as to determine the power shedding ratio to the overall system by a ratio to the sum of the outputs of all the generators.

On the other hand, the process for the supply-and-demand imbalance state of the state C is executed by a state C power controlling machine judgement process 407 and a state C frequency characteristic estimation process 408. First, the state C power controlling machine judgement process 407 recognizes the generator or generators conducting the power control under the state C. In other words, the load reference value LD sensed on the on-line basis and the load shedding value P are inputted from the generator sensing data base 16 to acquire the existence/absence of the free-operation type generators and the operation margin ratio. Here, the term "free-operation" means the operation mode in which a predetermined quantity of reserve power is set with respect to the frequency change, such as the governor operated in parallel. The term "operation margin ratio" means the output width of reserve power and is expressed by the operation margin ratio $P_{GFN}$ of the generator N. The unit is assumed to be the p.u. value for its own rated output $P_{ON}$. The generators which are not operated in parallel and the generators not having reserve power in the power control can be coped with by handling $P_{GFN}$ as $P_{GFN}0$.

First, the group of the free-operation type generators are set to the generator group $S_C$ as the group of the generators capable of power control under the state C from the judgement result on the free-operation of each generator in the state C power controlling machine judgement process 407. Next, the state C frequency characteristic estimation process 408 determines the frequency characteristic coefficient $k_GC$ of the generator group $S_C$ in accordance with the following equation (9). The value $k_GC$ calculated by this process expresses the sensitivity coefficient representing the frequency characteristics of the generator group under the supply-and-demand imbalance state of the state C shown in the supply-and-demand imbalance region 34 in FIG. 3.

$$K_G C = \frac{\sum_{N}^{S_C} P_{ON} \cdot K_{GN}}{\sum_{N}^{S_A} P_{GN}} \quad (9)$$

Incidentally, because the boundary between the state B as the supply-and-demand imbalance region 33 and the state C as the supply-and-demand imbalance region 34 is the supply-and-demand balance point, the process for estimating this supply-and-demand imbalance state is not necessary. Therefore, a boundary C/D estimation process 409 calculates the supply-and-demand imbalance quantity P corresponding to the boundary C/D as the next process in accordance with the following equation (10). This process is similar to that of the boundary A/B estimation process 406.

$$P_{GF} = \frac{\sum P_{ON} \cdot P_{GFN}}{\sum P_{GN}} \quad (10)$$

Since the operation shedding ratio $P_{LMN}$ of each generator represents the ratio to its own rated output $P_{ON}$, it is converted to the MW base and its ratio to the sum of all the generator outputs is employed to represent the operation shedding ratio of the overall system.

Next, a state D frequency characteristic estimation process 410 estimates the sensitivity coefficient $k_G D$ expressing the frequency characteristics of the generator group in the supply-and-demand imbalance state of the state D shown in the supply-and-demand imbalance region 35 of FIG. 3. In this case, because the generator subjected to the power control to cope with the frequency fluctuation cannot be assumed, the coefficient k D is set to $k_G D=0$.

The processes described above are the operation process in the generator frequency characteristic estimation process 22 shown in FIG. 2. This process 22 provides the generator main factor components of the frequency characteristics obtained by dividing the supply-and-demand imbalance into four segments as represented by the segmented lines 31 shown in FIG. 3.

The system frequency characteristic estimation process 23 shown in FIG. 2 executes supplementation-correction of the frequency characteristics of the generator group obtained by the generator frequency characteristic estimation process 22 by the frequency characteristic coefficient $k_L$ of the load. In other words, $k_L$ is added to each of $k_G A$, $k_G B$, $k_G C$ and $k_G D$ obtained by the generator frequency characteristic estimation process 22, so as to obtain the frequency characteristic coefficients $k_S A$, $k_S B$, $k_S C$ and $k_S D$ of the overall system under the state A, the state B, the state C and the state D, respectively. Incidentally, it will be appreciated that the processes shown in FIGS. 2 and 5 are stored in the form of program codes that can be read and executed by the computer constituting the estimation means 19, in recording media, such as semiconductor memories typified by ROMs, various types of disks and tapes. The program codes may be installed in the memory of the estimation means 19 by loading via a network.

The process of the system frequency characteristic estimation means 19 is completed by the processes described above, and the frequency characteristics of the overall system represented by the segmented lines 31 that divide the supply-and-demand imbalance into four segments as shown in FIG. 3 can be estimated. In this way, the frequency characteristic estimation apparatus according to the first embodiment can grasp the condition of the power system, particularly the change of the frequency characteristics, in response to the operation condition of the generators. As a result, the first embodiment can improve accuracy or reliability in the operation or control of the power system.

The first embodiment represents an example of the frequency characteristic estimation apparatus for only estimating and outputting the frequency characteristics, but the present invention can be adapted not only to the frequency characteristic estimation apparatus of this type but also to a control system making use of the frequency characteristics. Next, a controller as an application example of the frequency characteristic estimation apparatus according to the present invention will be explained.

(Second Embodiment)

Figure 6:
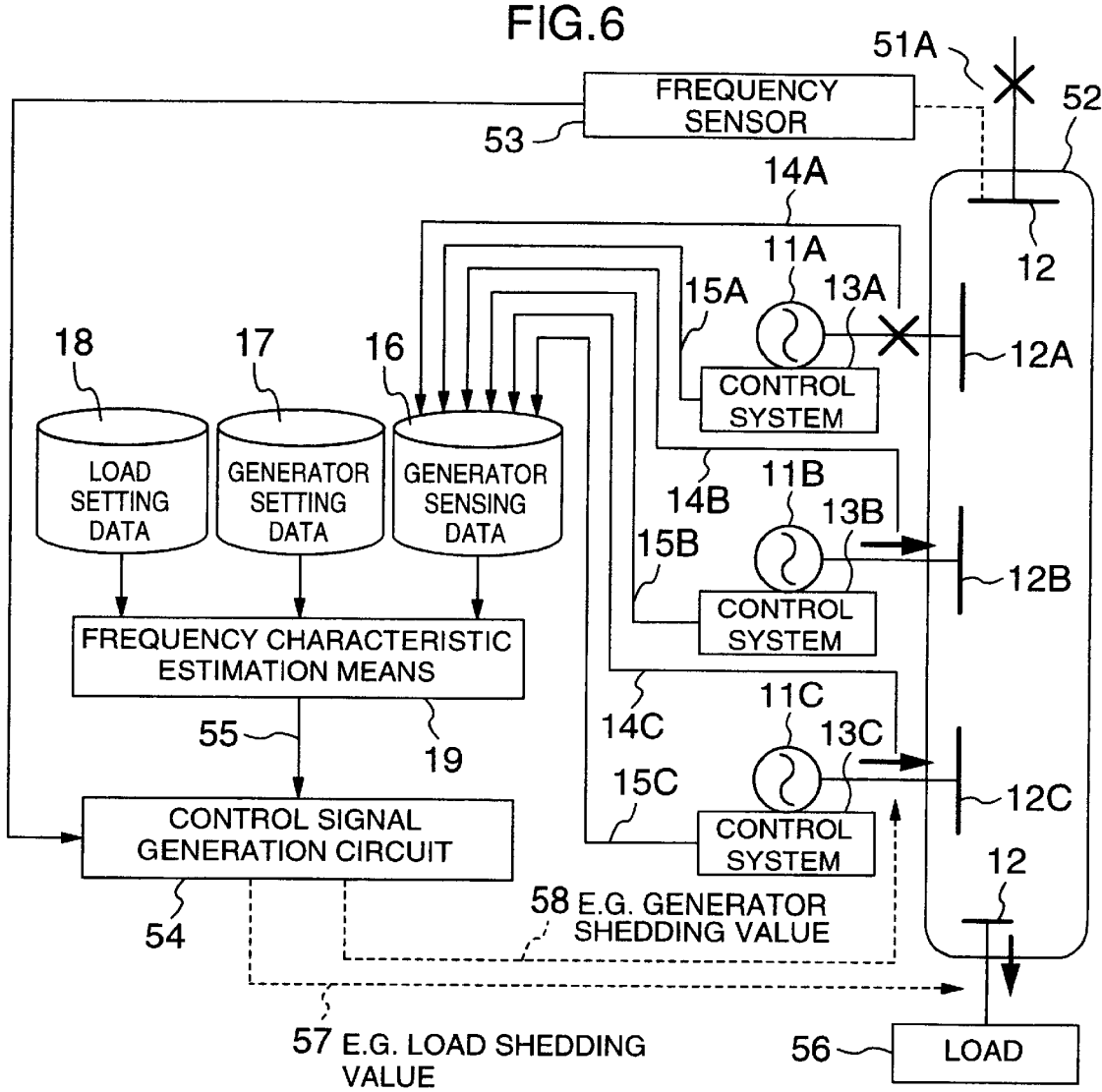
FIG. 6 is a structural block diagram of a frequency stabilization apparatus obtained by applying the frequency characteristic estimation apparatus of the present invention.

FIG. 6 shows an embodiment wherein the frequency characteristic estimation apparatus according to the present invention is applied to a frequency stabilization apparatus of an electric power system. The frequency stabilization apparatus controls urgently the supply-and-demand balance inside the power system so as to stabilize the frequency of the remaining power system when a partial system of the power system is cut off, for example. In FIG. 6, like reference numerals will be used to identify like constituent members having similar functions as in FIG. 1 and the explanation of such members will be omitted. The differences from FIG. 1 are that the power system 52 includes a partial system connected through a tie-line 51 and that a frequency sensor 53 for sensing the system frequency of the power system 52 and a control signal generator 52 such as supply-and-demand imbalance resolution quantity calculation means, etc, are provided. When a partial system is cut off from the power system 52 by the system separation at the tie-line 51, for example, the frequency stabilization apparatus keeps the frequency of the power system 52.

First, the frequency sensor 53 senses the frequency of the power system 52 and inputs its data to the control signal generation circuit 54. This circuit 54 determines the frequency deviation from the rated frequency on the basis of the sensing result of the frequency sensor 53. When this frequency deviation is out of the allowable range, a control signal is applied to the control object so that the supply-and-demand balance is controlled appropriately and the frequency is stabilized.

Figure 7:
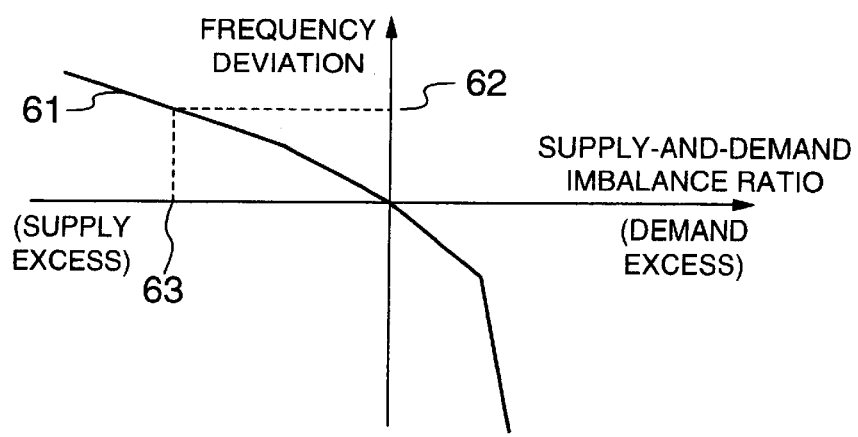
FIG. 7 is an explanatory view useful for explaining a frequency stabilization control by using the frequency characteristic estimation result according to the present invention.

In other words, when a shedding quantity instruction circuit 54 is a supply-and-demand imbalance resolution quantity calculation circuit, the frequency characteristics 55 of the power system 52 estimated by the frequency characteristic estimation apparatus 19 are inputted and the supply-and-demand imbalance quantity corresponding to the frequency deviation are estimated by using the frequency characteristics 55. As shown in FIG. 7, the supply-and-demand imbalance quantity 63 corresponding to the sensed frequency deviation 62 is estimated on the basis of the estimated frequency characteristics 61 estimated by the frequency characteristic estimation apparatus 19. Since the estimated frequency characteristics 61 are calculated in terms of the system capacity base [p.u. unit], the supply-and-demand imbalance quantity 63 can be converted to the MW unit by multiplying the value of the MW expression of the system capacity.

When the supply-and-demand imbalance is the supply excess, for example, an urgent load shedding instruction 57 is outputted to the load 56 inside the power system 52 so as to reduce the supply-and-demand imbalance quantity. When the supply-and-demand imbalance is the supply excess, on the contrary, an urgent generator shedding instruction 58 is outputted to the generator 11 inside the power system 52 so as to solve the supply-and-demand imbalance quantity 63.

The generator shedding quantity and the load shedding quantity necessary for stabilizing the frequency can be calculated in accordance with the operation condition of the generators by installing such a frequency stabilization apparatus in the power system, so that the frequency can be reliably kept and moreover, reliability of the system maintenance against the excessive control or the insufficient control can be improved. Particularly, the frequency stabilization apparatus is effective for stabilizing the system when the system is separated.

Assuming that a power system from which a power system 52 containing about ten sets of generators is eventually cut off in an area where generators are concentratedly disposed is the control object of the frequency stabilization control, for example, the existence of even two to three sets of generators having different performance from those of nuclear power plants and conventional thermal power plants such as combined cycle power plants in the separated power system 52 exerts significant influences on the separated system as a whole, and the frequency characteristics greatly change before and after the system separation. If the frequency characteristics are erroneously grasped in such a case, correct calculation of the control quantity for frequency stabilization is likely to fail. There might be also the case where at least four or five sets of generators are controlled for stabilizing the frequency, too. In such a case, the generator configuration and the change of their operation condition exert relatively great influences on the separated power system 52 as a whole and the frequency characteristics greatly change before and after the control is executed. Therefore, when the frequency control is added in multiple stages, the frequency characteristics must be grasped.

The frequency stabilization apparatus having the function of estimating the frequency characteristics as represented by the second embodiment will provide the effect of accomplishing the correct control in frequency stabilization in the system separation control. However, the frequency stabilization apparatus of the second embodiment is neither directed to the case of the system separation operation alone nor limited specifically to the scale of the system, but can be broadly applied to the operations of various power systems.
(Third Embodiment)

Figure 8:
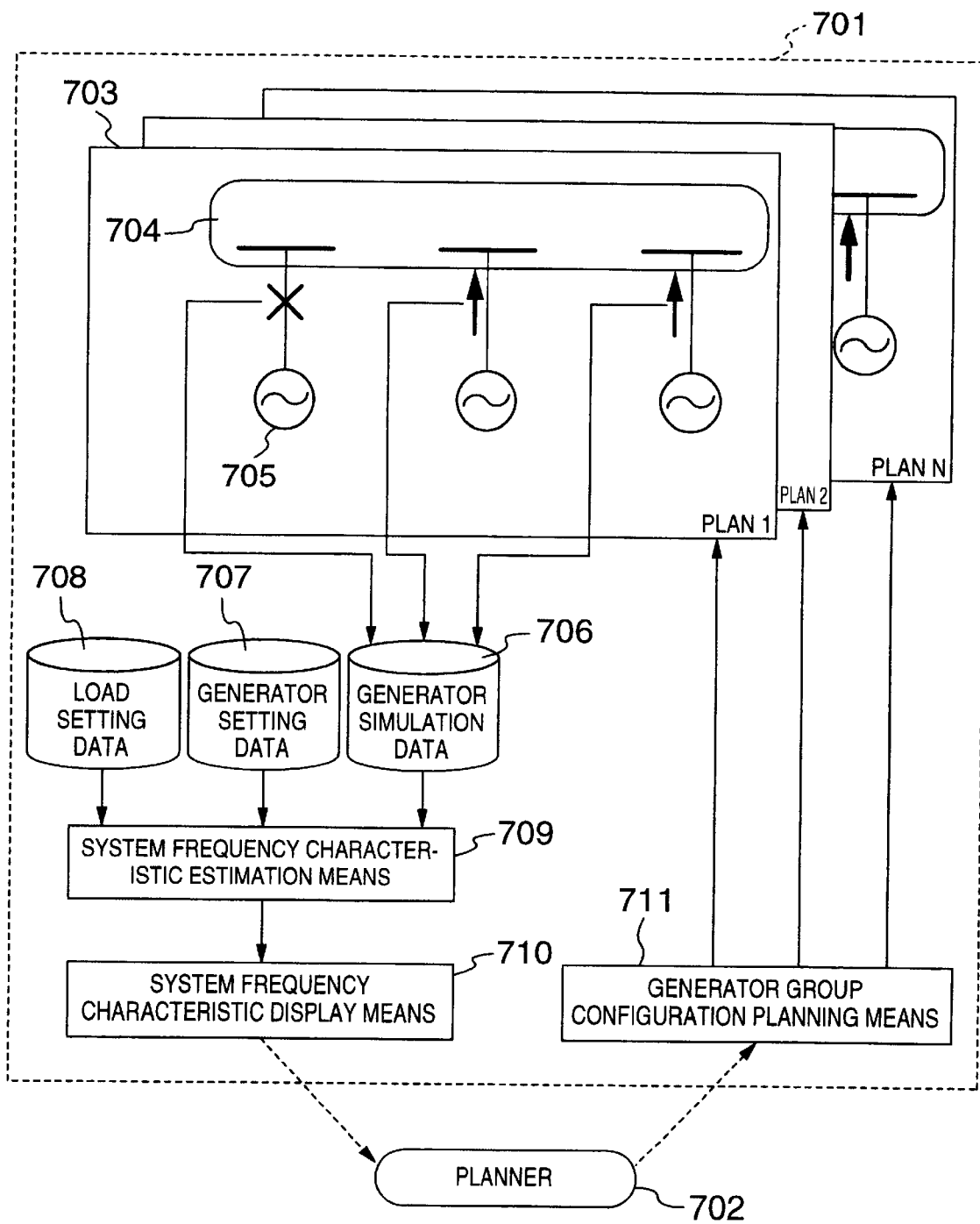
FIG. 8 is a structural block diagram of a generator planning support system obtained by applying the frequency characteristic estimation apparatus according to the present invention.

FIG. 8 shows the third embodiment wherein the frequency characteristic estimation apparatus of the present invention is applied to a generator planning support system of a power system. When a plan for the start/stop and an operation method is prepared for a plurality of generators, for example, the generator planning support system has the functions of estimating the frequency characteristics of the power system equipped with the planned generator configuration, submitting the estimation result to a planner and supporting the generator planning.

As shown in FIG. 8, the generator planning support system 701 generates and outputs to a planner the estimation result of the frequency characteristics of the planned power system constituted on the basis of the input data given by the inputting operation by the planner 702 of the plan of the generator configuration. First, the generator planning support system 701 inputs and stores a plurality of planning data M (M=1, 2, ..., M) 703 of the generator configuration worked out by the planner 702. The content of the individual plan M contains a planned power system 704 and a plurality of generators 705 in the planned power system 704. The planning work of the planner 702 is directed to the planning of the start/stop and the operation method of each of a plurality of generators 705.

First, a generator simulation data base 706 corresponding to the generator sensing data base 16 explained with reference to FIG. 1 is generated by taking specifically the separation or parallel connection state of each generator 705 to the power system 704 and its output state into consideration. Next, reference values not depending on a plurality of generators 705 and the operation of their control system are stored in a generator setting data base 707 corresponding to the generator setting data base 17 explained with reference to FIG. 1. The frequency characteristics of the load, too, are stored in a load setting data base 708 in the same way as the load setting data base 17 explained with reference to FIG. 1.

System frequency characteristic estimation means 709 estimates the frequency characteristics of the generator group on the basis of the data of the generator simulation data base 706 and the data of the generator setting data base 707 in the same way as the system frequency characteristic estimation process 19 explained with reference to FIG. 1. The frequency characteristics of the load stored in the load setting data base 708 are added for correction, and the frequency characteristics of the overall power system are estimated. The content of the estimation operation is the same as that of the system frequency characteristic estimation process 19 explained with reference to FIG. 2.

Next, system frequency characteristic display means 710 submits to the planner 702 the outline of the estimated frequency characteristics generated by the system frequency characteristic estimation means 708. The content submitted thereby includes the frequency characteristic coefficients in the supply-and-demand imbalance region 32 and the supply-and-demand imbalance region 33 shown in FIG. 3 and reserve output power, such as momentary reserve power, of the planned power system relating to the boundary between the state C and the state D. Index values for the operation as the reference values for the estimation value of the frequency characteristics are submitted in order for the planner 702 to change or adjust the plan.

The planner 702 gains access to generator group configuration planning means 711 on the basis of these values, and changes the start/stop of the individual generator and its operation method or inputs a new plan. The system frequency characteristic estimation means 709 immediately estimates the frequency characteristics of the planned power system relating to each plan on the basis of the content of the plan which is updated by this generator group configuration planning means 711, and responds and outputs the result to the system frequency characteristic display means 710.

According to the generator planning support system of the power system having the construction described above, the planner can easily examine and confirm whether or not the frequency characteristics are reasonable in the generator configuration of the planned power system and in the operation method of the individual generators. At the same time, because the calculation quantity of a series of the estimation operation is small, the interactive operation can be made for new planning and for the content of revision of the plan, and the observation of the planner can be assisted.
(Fourth Embodiment)

Figure 9:
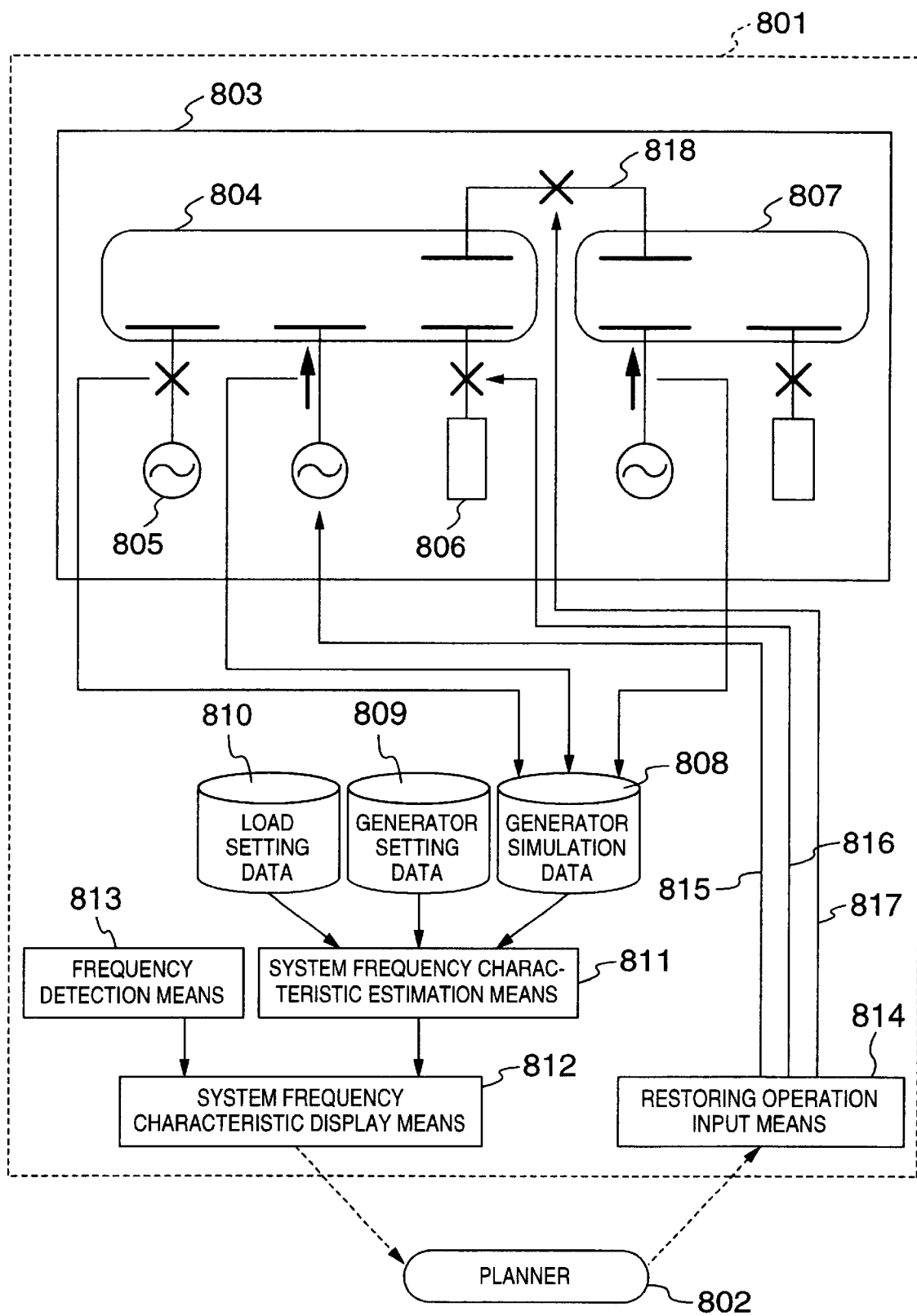
FIG. 9 is a structural block diagram showing the construction of a planning support system for a restoring operation plan obtained by applying the frequency characteristic estimation apparatus of the present invention.

FIG. 9 shows the fourth embodiment wherein the frequency characteristic estimation apparatus according to the present invention is applied to a simulation system in the restoring operation at the time of accident of the power system. In other words, in the frequency characteristics are estimated in a restoration plan which assumes the occurrence of the accident requiring the restoring operation in the power system, divides the power system into a plurality of unit systems and conducts re-connection in the unit of the unit systems or changes the start/stop of each of a plurality of generators and its operation method, this embodiment estimates the frequency characteristics and then submits the condition of the quantity for solving the supply-and-demand imbalance, necessary for keeping the frequency.

In FIG. 9, the simulation system 801 accepts the input operation by the planner 802 about the restoring operation plan and outputs to the planner the estimation results of the frequency characteristics of a virtual system after the restoring operation on the basis of the input operation.

In the simulation system 801, the system condition of the simulated case of the restoration object or the system condition estimated by other means on the basis of the actual measurement result is stored in memory means as the simulated system condition 803 of the simulated initial condition. It will be assumed hereby that the simulated system condition 803 contains a virtual power system 804, a plurality of generators 805 and a plurality of loads 806 inside the virtual power system and a unit power system 807 cut off from the main system 804.

First, the generator simulation data base 808 corresponding to the generator sensing data base 16 shown in FIG. 1 is generated by taking the separation/connection of each generator and its output condition into specific consideration. Reference values of a plurality of generators 805 and those which do not depend on the operation of the control system of these generators are stored in a generator setting data base 809 corresponding to the generator setting data base 17. As to the load, too, the frequency characteristics of the load are stored in the load setting data base 810 in the same way as the load setting data base 18 shown in FIG. 1.

System frequency characteristic estimation means 811 estimates the frequency characteristics of the generator group by the data from the generator simulation data base 808 and the generator setting data base 809 in the same way as the system frequency characteristic estimation process 19 shown in FIG. 1. The frequency characteristics of the load stored in the load setting data base 810 are added for correction, and the frequency characteristics of the overall power system are estimated. The estimation method is similar to the method of the system frequency characteristic estimation process 19 explained with reference to FIG. 2.

Next, the system frequency characteristic display means 812 displays to the planner 802 the outline of the estimated frequency characteristics generated by the system frequency characteristic estimation means 811 and the supply-and-demand balance state estimated from the frequency and the frequency characteristics sensed or estimated by the frequency detection means 813. The outline of the estimated frequency characteristics to be displayed is similar to the example explained in the third embodiment. The display content of the supply-and-demand balance state is the supply-and-demand balance calculated by the same method as the method shown in FIG. 7.

The planner 802 carries out planning of the restoring operation by taking the frequency characteristics and the supply-and-demand balance displayed by the system frequency characteristic display means 812 into account. In other words, the planner 802 gains access to restoring operation input means 814 and inputs an instruction 815 about the generators such as the power control of the generators and their separation/connection, an instruction 816 of the load such as separation and re-connection of the load, an instruction 817 of a breaker for the tie-line 818, and so forth.

The input content by the restoring operation input means 814 is virtually simulated on the simulated system condition 803, and the system frequency estimation calculation is immediately executed for the simulated system condition so updated in order to output the simulation result in the same way as in the third embodiment.

This restoring operation support system can easily examine whether or not the frequency can be maintained in the system condition after the planned restoring operation is done. This support system can also examine whether the frequency characteristics of reserve power of the system are reasonable. At the same time, this support system can supplement the observation of the planner because the calculation quantity of a series of the calculation operations is small and because the interactive operation is possible for planning and correcting the restoring operation.

If any generators are added afresh in the fore-going embodiments, the design values and the reference values of the off-line data base need be added and by so doing, no maintenance such as setting is required at all in the subsequent normal operation. Therefore, the reduction of the operation factors can be expected.

We claim:

1. A method of estimating frequency characteristics of a power system, comprising the steps of:

defining sensitivity coefficients of power control of generators relative to a frequency deviation as frequency characteristic coefficients of said generators;

setting power controllable generators of said power system into a generator group, and determining the frequency characteristic coefficient of said generator group;

multiplying a frequency characteristic coefficient of each generator by a proportion of its rated output to an overall generator rated output, adding the results of the multiplication for all of said generators to determine the sum obtained from said adding as an overall frequency characteristic coefficient; and executing said steps for the generator group gathered in accordance with different supply-and-demand conditions to provide estimated frequency characteristics for an overall supply-and-demand condition of the generator group.

2. A method of estimating a frequency characteristic coefficient of a power system according to claim 1, which further comprises the steps of:

summing the product of a frequency characteristic coefficient of each generator and its rated output for all of said power controllable generators; and dividing the sum by the total output of the generator group to obtain said frequency characteristic coefficient of said generator group.

3. A method of estimating a frequency characteristics of a power system according to claim 1, wherein said frequency characteristic coefficient of said generator is determined for those of said generators which have a margin of power control inclusive of reserve power.

4. A method of estimating a frequency characteristic coefficient of a power system according to claim 1, which further comprises the steps of:

dividing the operation condition of said generators into a first state where all of said generators have a margin of power control, a second state where a part of said generators is limited in power control, a third state where a part of said generators reaches the limit of power control while the remaining ones of said generators have a margin of power control within the range of reserve power and a fourth state where all of said generators reach the limit of power control inclusive of reserve power;

dividing a supply-and-demand imbalance quantity of power into first to fourth regions in such a manner as to correspond to said first to fourth states, respectively; and determining said frequency characteristic coefficient of said generator group for each of said regions.

5. A method of estimating a frequency characteristic coefficient of a power system according to claim 1, wherein the frequency characteristic coefficient of each generator is determined on the basis of a drooping ratio of a governor provided to said generator.

6. A frequency characteristic estimation apparatus including a computer having an arithmetic circuit, a memory device and a control circuit for controlling said arithmetic circuit and said memory device, for estimating, by said computer, frequency characteristics for a supply-and-demand imbalance quantity of a power system including a generator group comprising a plurality of generators, wherein:

said memory device stores a condition quantity data of each of said generators, a reference data of a governor so disposed as to correspond to each of said generators and a control data; and said arithmetic circuit includes means for defining a sensitivity coefficient of power control of each generator with respect to a frequency deviation as a frequency characteristic coefficient of said generator; grouping power controllable generators of said power system into a generator group and determining a frequency characteristic coefficient of said generator group; multiplying the frequency characteristic coefficient of each of said generators by the proportion of its rated output to the total rated output of said generators, adding the products so obtained for all of said generators and determining the sum as an overall frequency characteristic coefficient; and executing the above-defined operations for a power controllable generator group gathered in accordance with different supply-and-demand conditions and outputting a signal representing estimated frequency characteristics for the overall supply-and-demand condition of the generator group; said operations of said means being executed on the basis of the data stored in said memory device and under the control of said control circuit.

7. A control system for controlling a power system including a frequency characteristic estimation apparatus including a computer having an arithmetic circuit, a memory device and a control circuit for controlling said arithmetic circuit and said memory device, for estimating, by said computer, frequency characteristics for a supply-and-demand imbalance quantity of said power system including a generator group comprising a plurality of generators, wherein said frequency characteristic estimation apparatus includes:

said memory device for storing condition quantity data of each of said generators, a reference data of a governor so disposed as to correspond to each of said generators and a control data;

estimated frequency characteristic signal output means including said arithmetic unit, for defining a sensitivity coefficient of power control of said generators with respect to a frequency deviation as a frequency characteristic coefficient of said generator on the basis of the data stored in said memory device and under the control of said control circuit; grouping power controllable generators of said power system as a population and determining a frequency characteristic coefficient of said generator group; multiplying the frequency characteristic coefficient of each of said generators by the proportion of its rated output to the total rated output of said generators, adding the products so obtained for all of said generators and determining the sum as an overall frequency characteristic coefficient; and executing the above-defined operations described above for power controllable generator groups gathered in accordance with different supply-and-demand conditions and outputting a signal representing estimated frequency characteristics for the overall supply-and-demand condition; and means for generating an instruction signal for a control object of said power system on the basis of the output of said estimated frequency characteristic signal output means.

8. A control system of a power system according to claim 7, wherein said instruction signal generation means includes at least one of a load control signal and a generator control signal as said instruction signal.

9. A control system of a power system according to claim 7, wherein said sensitivity coefficient of said generator is determined on the basis of a drooping ratio of a governor provided to said generator.

10. A control system for controlling a power system including a frequency characteristic estimation apparatus including a computer having arithmetic means, memory means and means for controlling said arithmetic means and said memory means, for estimating, by said computer, frequency characteristics for a supply-and-demand imbalance quantity for said power system including a generator group comprising a plurality of generators, wherein said frequency characteristic estimation apparatus includes:

said memory means for storing a rated output of each of said generators, a drooping ratio set to a governor so disposed as to correspond to each of said generators, a load reference value and a load shedding condition;

said arithmetic means for inputting said drooping ratio of each of said governors from said memory means, determining a sensitivity coefficient of power control for of each of said generators for a frequency deviation on the basis of said drooping ratio, using said sensitivity coefficient as a frequency characteristic coefficient of each of said generators, multiplying said frequency characteristic coefficient of each of said generators by its rated output and summing the products, adding a power control ratio of each of said generators for the frequency deviation to the load reference value of each of said generators, multiplying the sum so obtained by said rated output to obtain the output of each of said generators, summing the output of each of said generators to obtain the total output of said generator group, dividing the sum of said frequency characteristic coefficients by the total output to obtain a frequency characteristic coefficient of said generator group, and outputting a signal representing estimated frequency characteristics in said power system on the basis of said frequency characteristics of said generator group; and means for generating a control signal for a control object of said power system in accordance with said signal output from said frequency characteristic estimation apparatus.

11. A control system of a power system according to claim 10, wherein said frequency characteristic coefficient of said generator is determined for those of said generators which have a margin of power control inclusive of reserve power by said frequency characteristic estimation apparatus.

12. A control system of a power system according to claim 10, wherein said arithmetic means divides the operation condition of said generators, on the basis of the load shedding condition of said generators, into a first state where all of said generators have a margin of power control, a second state where a part of said generators is limited in power control, a third state where a part of said generators reaches the limit of power control while the remaining ones of said generators have a margin of power control within the range of reserve power and a fourth state where all of said generators reach the limit of power control inclusive of reserve power, and determines said frequency characteristic coefficient of said generator group for each of said states.

13. A control system of a power system according to claim 10, wherein said arithmetic means divides said power system into a plurality of unit power systems, sets a plurality of reconstruction patterns of said power systems by assuming the system separation of said unit power systems, provides estimated frequency characteristics for each of said reconstruction patterns and stores the estimated frequency characteristics in said memory means.

14. A frequency stabilization apparatus of a power system including a frequency characteristic estimation apparatus including a computer having an arithmetic circuit, a memory device and a control circuit for controlling said arithmetic circuit and said memory device, for estimating, by said computer, frequency characteristics for a supply-and-demand imbalance quantity of a power system including a generator group comprising a plurality of generators, wherein:

said memory device stores a condition quantity data of each of said generators, a reference data of a governor so disposed as to correspond to each of said generators and a control data;

said arithmetic circuit includes means for defining a sensitivity coefficient of power control of said generator with respect to a frequency deviation as a frequency characteristic coefficient of said generator; grouping power controllable generators of said power system as a generator group and determining a frequency characteristic coefficient of said generator group; multiplying the frequency characteristic coefficient of each of said generators by the proportion of its rated output to the total rated output of said generators, adding the products so obtained for all of said generators and determining the sum as an overall frequency characteristic coefficient; and executing the above-defined operations for power controllable generator groups gathered in accordance with different supply-and-demand conditions and outputting a signal representing estimated frequency characteristics for the overall supply-and-demand condition of the generator group; said operations of said means being executed on the basis of the data stored in said memory device and under the control of said control circuit; and said arithmetic circuit includes:

means for dividing said power system into a plurality of unit power systems, setting a plurality of reconstruction patterns of power systems by assuming a system separation of said unit power systems, estimating the frequency characteristics for each of said reconstruction patterns and storing the frequency characteristics in said memory device; and means for reading estimated frequency characteristics corresponding to said reconstruction pattern after the system separation from said memory device when the system separation of said unit power systems occurs, calculating the supply-and-demand imbalance quantity on the basis of said estimated frequency characteristics, and performing controls inclusive of generator shedding and load shedding on the basis of said supply-and-demand imbalance quantity.

15. A planning support system of a power system including a frequency characteristic estimation apparatus including a computer having an arithmetic circuit, a memory device and a control circuit for controlling said arithmetic circuit and said memory device, and estimating, by said computer, frequency characteristics for a supply-and-demand imbalance quantity of a power system including a generator group comprising a plurality of generators, wherein said frequency characteristic estimation apparatus includes:

said memory device for storing a condition quantity data of each of said generators, a reference data of a governor so disposed as to correspond to each of said generators and a control data;

estimated frequency characteristic signal output means including said arithmetic circuit, for defining a sensitivity coefficient of power control of said generator with respect to a frequency deviation as a frequency characteristic coefficient of said generator on the basis of the data stored in said memory device and under the control of said control circuit; grouping power controllable generators of said power system as a generator group and determining a frequency characteristic coefficient of said generator group; multiplying the frequency characteristic coefficient of each of said generators by the proportion of its rated output to the total rated output of said generators, adding the products so obtained for all of said generators and determining the sum as an overall frequency characteristic coefficient; and performing the above-defined operations for power controllable generator groups gathered in accordance with different supply-and-demand conditions of the generator group and outputting a signal representing estimated frequency characteristics for the overall supply-and-demand condition; and wherein:

said arithmetic circuit estimates the frequency characteristics of said power system inclusive of momentary reserve power on the basis of said planning in response to the input of planning parameters of the start/stop of said generators and an operation method, outputs the estimation result from said output means and makes it possible to provide simulation for an economical load distribution at the time of system planning.

16. A planning support system of a power system according to claim 15, wherein simulation of said economical load distribution outputs and provides information on momentary reserve power or output reserve power and information on their target values in the operation from the estimation result of said estimated frequency characteristics.

17. A planning support system for the restoring operation of a power system including a frequency characteristic estimation apparatus including a computer having an arithmetic circuit, a memory device and a control circuit for controlling said arithmetic circuit and said memory device, for estimating, by said computer, frequency characteristics for a supply-and-demand imbalance quantity of a power system including a generator group comprising a plurality of generators, wherein said frequency characteristic estimation apparatus includes:

said memory device for storing a condition quantity data of each of said generators, a reference data of a governor disposed so as to correspond to each of said generators and a control data; and estimated frequency signal output means including said arithmetic circuit, for defining a sensitivity coefficient of power control of said generators with respect to a frequency deviation as a frequency characteristic coefficient of said generators; grouping power controllable generators of said power system as a generator group and determining a frequency characteristic coefficient of said generator group; multiplying the frequency characteristic coefficient of each of said generators by the proportion of its rated output to the total rated output of said generators, adding the products so obtained for all of said generators and determining the sum as an overall frequency characteristic coefficient; and performing the above-defined operations for a power controllable generator group gathered in accordance with different supply-and-demand conditions of the generator group and outputting a signal representing estimated frequency characteristics for the overall supply-and-demand conditions;

said output means estimating the frequency characteristics inclusive of momentary reserve power or output reserve power of said generators for a power system concerned with a reconstruction and an operation planning in the restoring operation of said power system from an accident, and supporting the planning of the restoring operation by outputting an estimation result.

18. A planning support system for the restoring operation of a power system according to claim 17, wherein said output means for supporting the planning of said restoring operation includes information on momentary reserve power or output reserve power of said generator, information of target values of these values and information of a resolution quantity of a supply-and-demand imbalance necessary for keeping the frequency.

19. A computer program product having a computer-readable recording medium, containing a program for executing the steps of:

defining a sensitivity coefficient of output control of generators for a frequency deviation as a frequency characteristic coefficient;

weighting the frequency characteristics of each of said generators of a generator group comprising a plurality of said generators belonging to a power system in accordance with the rated output of said generator and adding the results to determine a frequency characteristic coefficient of said generator group; and providing estimated frequency characteristics of said power system for the supply-and-demand imbalance quantity on the basis of the frequency characteristic coefficient of said generator group.

* * * * *